(12) United States Patent
Hahn et al.

(10) Patent No.: US 12,469,866 B2
(45) Date of Patent: Nov. 11, 2025

(54) INTEGRATED NOISE ATTENUATING VOLUME FOR FUEL CELL SYSTEM

(71) Applicant: GM GLOBAL TECHNOLOGY OPERATIONS LLC, Detroit, MI (US)

(72) Inventors: Joseph Hahn, White Lake Township, MI (US); Scott May, Daytona Beach, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 500 days.

(21) Appl. No.: 18/162,797

(22) Filed: Feb. 1, 2023

(65) Prior Publication Data
US 2024/0258543 A1    Aug. 1, 2024

(51) Int. Cl.
*H01M 8/04746*    (2016.01)
*H01M 8/04701*    (2016.01)

(52) U.S. Cl.
CPC ... *H01M 8/04753* (2013.01); *H01M 8/04708* (2013.01)

(58) Field of Classification Search
CPC ............... H01M 8/04708; H01M 8/04753
See application file for complete search history.

(56) References Cited

U.S. PATENT DOCUMENTS

2021/0111417 A1* 4/2021 Shimotori ........... H01M 8/0267

FOREIGN PATENT DOCUMENTS

CN        113540521 A  * 10/2021   ........ H01M 8/04723

OTHER PUBLICATIONS

Machine translation CN113540521A (Year: 2021).*

* cited by examiner

*Primary Examiner* — Victoria H Lynch
(74) *Attorney, Agent, or Firm* — Quinn IP Law

(57) ABSTRACT

A multi-function fuel delivery system, a method of providing fuel delivery and a noise-attenuating and fuel injector housing device address a root cause of audible noise in a fuel delivery system by placing a sufficiently sized volume directly at the inlet of pulsed-type hydrogen injectors, thereby eliminating pressure pulsation and audible noise created by pressure pulsations. Combining a noise-attenuating function and a fuel supply rail capable of supplying hydrogen to multiple injectors, with both performed within a single volume, addresses space-related and cost-related challenges as well as other challenges of the fuel delivery system. The multi-function fuel delivery system includes a hydrogen (H2) heat exchanger, an H2 fuel manifold, and an upper fuel rail (UFR) that receives H2 that is noise-attenuated by the H2 fuel manifold and provides the noise-attenuated H2 simultaneously to a plurality of injectors.

20 Claims, 3 Drawing Sheets

INTEGRATED NOISE ATTENUATING VOLUME FOR FUEL CELL SYSTEM

INTRODUCTION

The present disclosure is related to fuel delivery systems. Specifically, the present disclosure is related to hydrogen (H2) fuel delivery systems.

Some fuel rail chambers utilize a separate H2 supply chamber, a multi-injector fuel rail and a heat exchanger. Although pulsed-type H2 injectors may provide precise control of fuel delivery to H2 fuel cell systems and H2 combustion engines, noise and pressure pulsations from sudden opening and closing operations of the pulsed-type injectors create noise and vibration in devices in which the chambers are utilized, such as a ground vehicle, an airplane or a power generator. Therefore, design of the fuel feed system creates an unacceptable level of audible noise resulting from pressure pulsations.

An H2 manifold, usually with a sizable internal volume may be utilized upstream of the pulsed-type H2 injectors, with corresponding components therebetween, to reduce generated audible noise. However, while this reduces the noise itself, this construction adds additional volume and components to the system and does not address the root cause of the audible noise.

Furthermore, an anode heat exchanger may be utilized to warm cold H2 from thermal systems in order to mitigate low temperature risks of the cold H2 to Proton-Exchange Membrane (PEM) fuel cell systems and combustion engines, such as icing of seals during freezing conditions and excessive water condensation in the fuel stack that impacts fuel cell electrochemical reaction performance.

However, utilizing separate volumes to provide the various functions has space-related and cost-related challenges as well as other challenges. The present disclosure addresses the root cause of the audible noise by placing a sufficiently sized volume directly at the inlet of pulsed-type H2 injectors, thereby eliminating pressure pulsation and audible noise created by pressure pulsations. The present disclosure further provides a system and housing device that combines a noise-attenuating function and a fuel supply rail capable of supplying H2 to multiple injectors with both performed within a single volume.

SUMMARY

The present disclosure provides a multi-function fuel delivery system, a method of providing fuel delivery and a noise-attenuating and fuel injector housing device. The fuel delivery system includes an H2 heat exchanger receiving cold H2 and performing an H2 fuel heating/cooling function on the H2, an H2 fuel manifold receiving H2 heated by the H2 heat exchanger and performing an H2 noise-attenuating function to reduce noise, and an upper fuel rail (UFR). The UFR receives H2 noise that is attenuated by the H2 fuel manifold and provides the noise-attenuated H2 simultaneously to a plurality of injectors, where the H2 fuel manifold and the UFR are housed in a single chamber.

The chamber may be located at an inlet of the plurality of injectors. The plurality of injectors may be pulsed-type H2 injectors.

A sidewall or face of the H2 fuel manifold may include an H2 input port. The chamber may provide mechanical isolation of the plurality of injectors.

The fuel delivery system may further include a lower fuel rail (LFR) providing H2 fuel from an outlet of the plurality of injectors. The LFR may be mounted to the chamber.

The noise-attenuating function may consider a number of the plurality of injectors, system pressure, and flow rates. The UFR may be integrated into a primary flow path of the noise-attenuated H2 provided to the plurality of injectors.

The method in accordance with one or more embodiments includes receiving cold H2 and performing an H2 heating/cooling function on the H2, performing an H2 noise-attenuating function on the heated H2 to reduce noise, and providing the noise-attenuated H2 simultaneously to a plurality of injectors, where the H2 noise-attenuating function and providing the noise-attenuated H2 are performed in a single chamber. The housing device includes an H2 fuel manifold contained in a noise-attenuating volume. The H2 fuel manifold receives heated H2 via a fuel input port located on a sidewall or face of the noise-attenuating volume and performs a noise-attenuating function on the heated H2 to reduce noise. A UFR receives H2 noise-attenuated by the H2 fuel manifold and provides the noise-attenuated H2 simultaneously to a plurality of injectors, where the noise-attenuating volume is mounted on an LFR and provides the noise-attenuated H2 from an outlet of the plurality of injectors and mechanically isolates the plurality of injectors.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, the present disclosure expressly includes any and all combinations and sub-combinations of the elements and features presented previously and subsequently.

Figure 1:
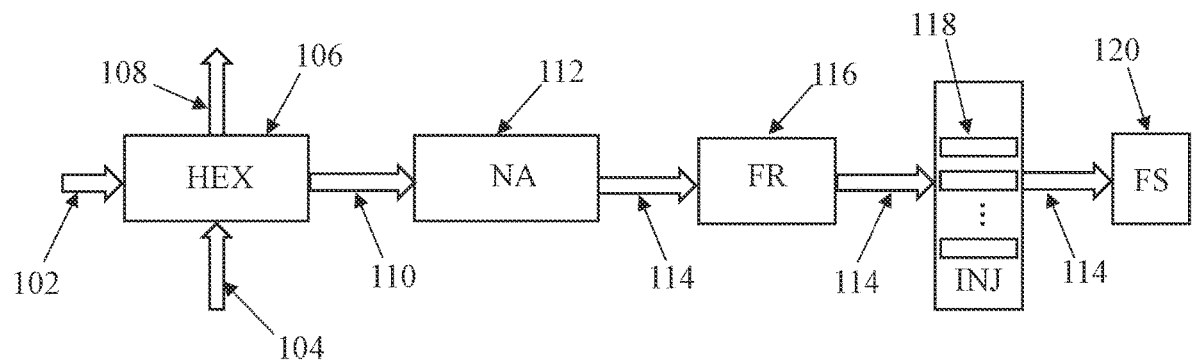
FIG. 1 illustrates a schematic diagram of a possible implementation of a fuel delivery system.

The present disclosure may be extended to modifications and alternative forms, with representative embodiments illustrated in the drawings and disclosed in detail herein. Inventive aspects of the present disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The following disclosure is merely exemplary in nature and is not intended to limit the present disclosure, application, or uses. It should also be understood that throughout the drawings, corresponding reference numerals indicate like or corresponding parts and features.

The present disclosure is susceptible of embodiment in many different forms. Representative examples of the disclosure are shown in the drawings and disclosed herein in detail as non-limiting examples of the disclosed principles. To that end, elements and limitations disclosed in the Abstract, Introduction, Summary, and Detailed Disclosure sections, but not explicitly set forth in the claims, should not be incorporated into the claims, singly or collectively, by implication, inference, or otherwise.

Example embodiments will now be disclosed more fully with reference to the accompanying drawings. The present disclosure relates generally to fuel delivery systems and, specifically, to H2 fuel delivery systems.

FIG. 1 illustrates a schematic diagram of a possible implementation of a fuel delivery system. As illustrated in FIG. 1, the fuel delivery system 100 is an H2 fuel delivery system and includes cold H2 input (CH2) 102 and coolant input (CLI) 104 to a heat exchange function (HEX) 106, with the HEX 106 outputting coolant (CLO) 108, warming/heating the CH2 102 and outputting warmed/heated CH2 102 (WH2) 110 to a noise-attenuator function (NA) 112.

The NA 112 performs noise attenuation on the WH2 110 to reduce noise caused by H2 pressure pulsations from injection events and provides noise-attenuated H2 (NH2) 114 to a fuel rail function (FR) 116. The FR 116 provides the NH2 114 to a plurality of injectors (INJ) 118. The INJ 118 provide the NH2 114 to a fuel cell stack (FS) 120 with a same flow rate as the flow rate of the NH2 114 input to the INJ 118 but at a reduced pressure. As further illustrated in FIG. 1, the HEX 106, NA 112, and FR 116 are provided by three separate components.

The INJ 118 in FIG. 1 are a representation of fuel pressure and fuel control devices that regulate how much NH2 114 is input to the FS 120 to provide cell stack operating power. Alternatively, a fuel control proportional valve may be utilized.

Figure 2:
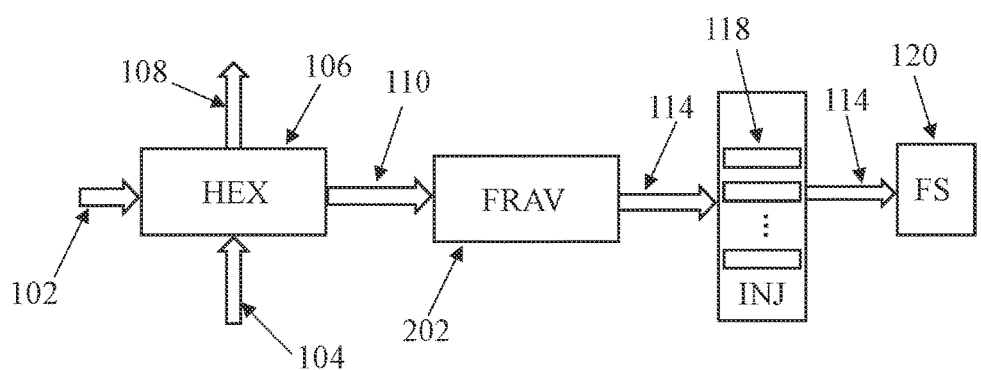
FIG. 2 illustrates a schematic diagram of an H2 fuel delivery system according to an embodiment of the present disclosure.

FIG. 2 illustrates a schematic diagram of an H2 fuel delivery system according to an embodiment of the present disclosure. As illustrated in FIG. 2, the system 200 combines the NA 112 and FR 116 into a single multi-functional component, specifically a fuel rail attenuating volume (FRAV) 202. By virtue of the NA 112 and FR 116 provided by a single multi-functional component, fewer components are utilized in a fuel cell system or H2 combustion engine, space is saved, and potential lower costs are incurred for engineering and sourcing work As further illustrated in FIG. 2, the H2 fuel delivery system 200 is a multi-function fuel delivery system. The fuel delivery system 200 may include the HEX 106 that performs an H2 fuel heating/cooling function, a noise-attenuating chamber that houses an H2 fuel manifold that performs an H2 fuel noise-attenuating function. The fuel delivery system 200 supplies H2 fuel simultaneously to a plurality of injectors.

The INJ 118 may be pulsed-type H2 injectors. The chamber may be located at an inlet of the INJ 118.

Figure 3:
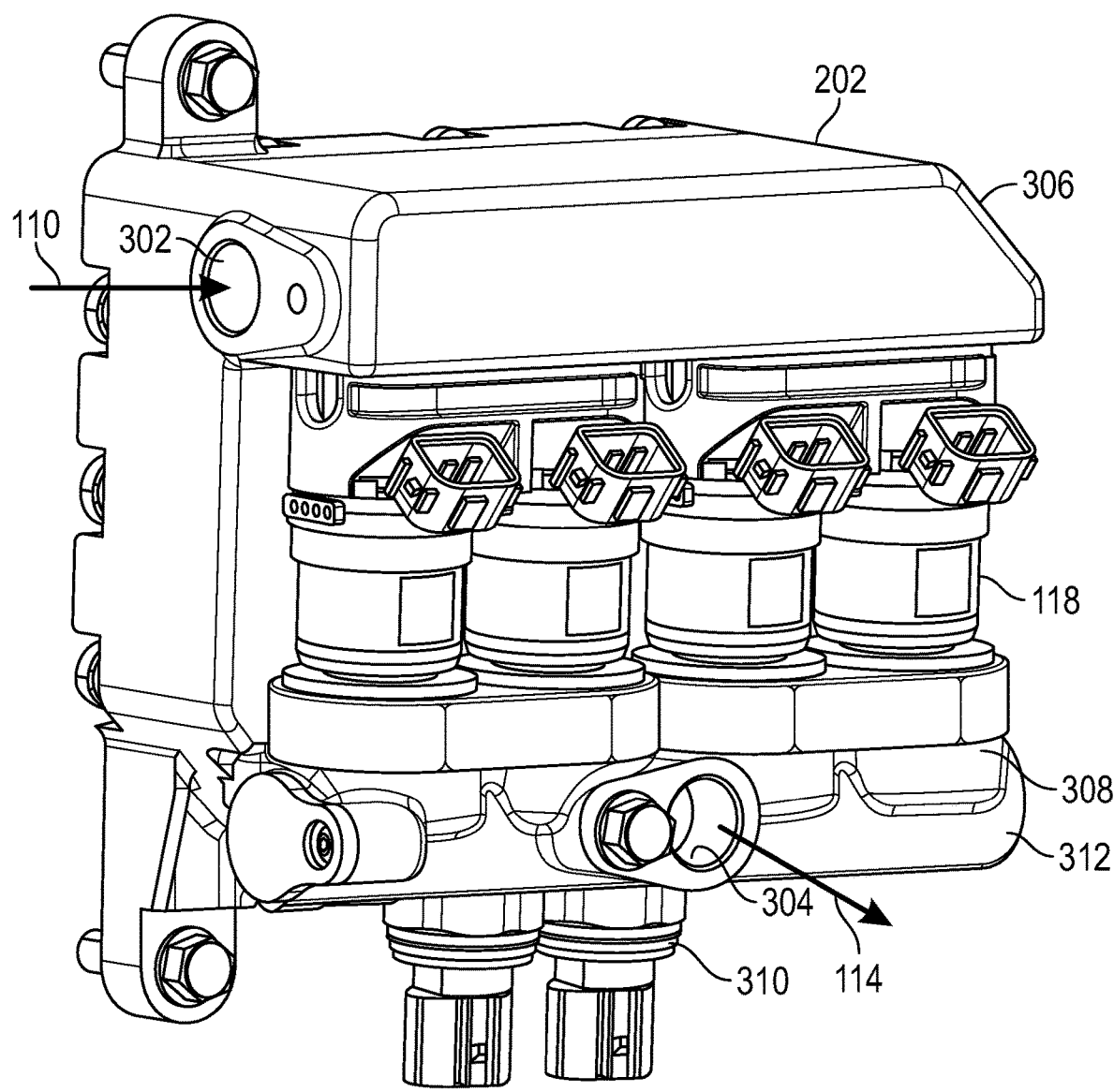
FIG. 3 illustrates a front view of a fuel rail attenuating volume and plurality of injectors according to an embodiment of the present disclosure.
Figure 4:
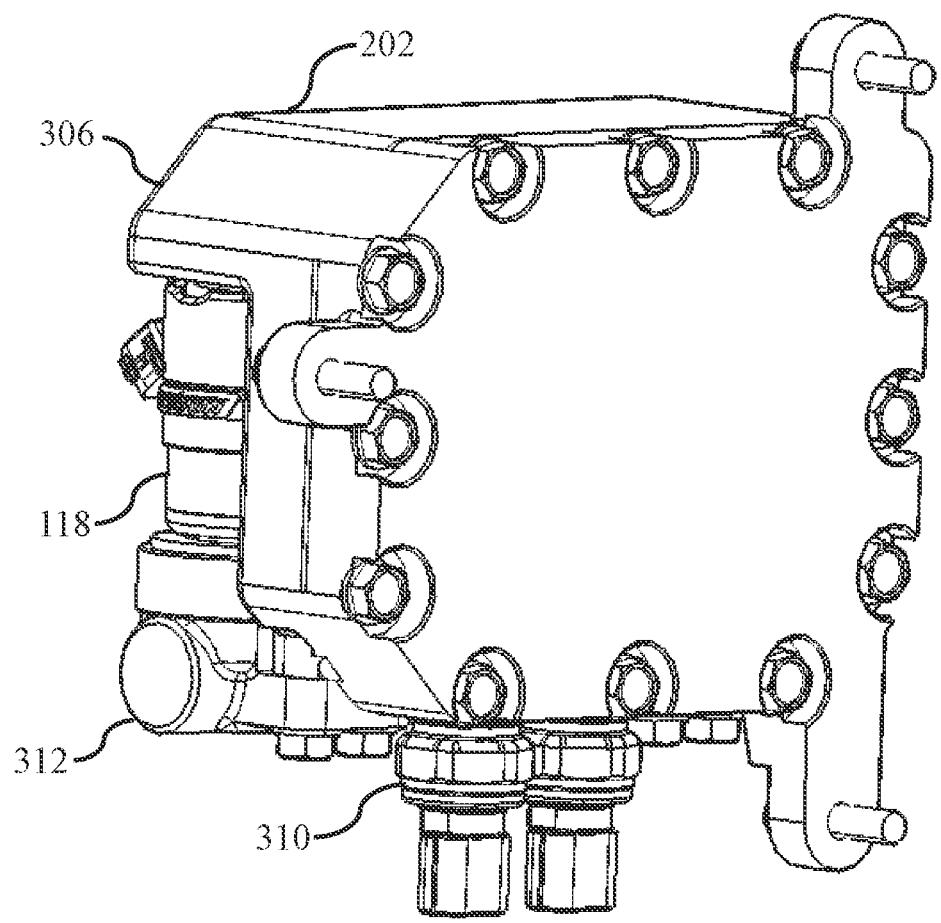
FIG. 4 illustrates a rear view of the fuel rail attenuating volume and plurality of injectors illustrated in FIG. 3.

FIG. 3 illustrates a front view of a fuel rail attenuating volume and plurality of injectors according to an embodiment of the present disclosure. FIG. 4 illustrates a rear view of the fuel rail attenuating volume and plurality of injectors illustrated in FIG. 3.

As illustrated in FIGS. 3 and 4, the FRAV 300 provides an inlet 302 for the WH2 110 and an outlet 304 for the NH2 114 output to the FS 120 (not illustrated). As further illustrated in FIG. 3, the FRAV 202 includes a noise-attenuating volume upper fuel rail (UFR) 306 into which the WH2 110 is input.

The UFR 306 contains the NA 112 and FR 116. The NA 112 performs the noise attenuation on the WH2 110 provides the NH2 114 to the FR 116. The FR 116 provides the NH2 114 to the INJ 118. The INJ 118 provide the NH2 114 to a lower fuel rail (LFR) 308. The LFR 308 provides the NH2 114 from an outlet of the plurality of injectors and utilizes pressure sensors 310, which are integrated into a resonator body (RB) 312, to provide the FS 120 with the same flow rate as the flow rate of the NH2 114 input to the INJ 118 but at the reduced pressure.

The present disclosure addresses several issues. Providing a chamber that has sufficient volume to contain a noise-attenuating function and a fuel supply rail, with the chamber positioned directly at an inlet of fuel cell injectors, provides various benefits. By combining only two functions in the chamber, volume of the chamber is minimized, and pressure pulsations may be more effectively reduced.

The present disclosure further reduces injector feed pressure drop during injector on-time, improves fuel pressure recovery during injector off-time, reduces pressure fluctuations at the inlet of the injectors, achieves more consistent injector flow rates, reduces workload of a control system, increases fuel injector flow during on-time, allows a smaller fuel injector count and results in corresponding cost savings and reduced complexity, improves range and component durability, reduces acoustic noise from pressure change within system components and eliminates fuel piping and routing, and reduces system leakage of hydrogen gas by virtue of less connections and sealing joints. Moreover, the present disclosure reduces system pressure drop from a Gas Handling Unit (GHU) that is upstream of the system of the present disclosure and which regulates high pressure from the tanks to the medium pressure of the system of the present disclosure such that the fuel pressure is considered low downstream of the injectors.

The detailed disclosure and the drawings are supportive and descriptive of the present disclosure, but the scope of the present disclosure is defined solely by the appended claims. While some of the best modes and other embodiments for carrying out the present disclosure have been disclosed in detail, various alternative designs and embodiments exist for practicing the present disclosure as recited in the appended claims. Moreover, the present disclosure expressly includes combinations and sub-combinations of the elements and features disclosed herein.

Aspects of the present disclosure have been presented in general terms and in detail with reference to the illustrated embodiments. Various modifications may be made by those skilled in the art without departing from the scope and spirit of the disclosed embodiments. One skilled in the relevant art will also recognize that the disclosed methods and supporting hardware implementations may be alternatively embodied in other specific forms without departing from the scope of the present disclosure. Therefore, the present disclosure is intended to be illustrative without limiting the inventive scope defined solely by the appended claims.

For purposes of the present disclosure, unless specifically disclaimed, use of the singular includes the plural and vice versa, the terms "and" and "or" shall be both conjunctive and disjunctive, and the words "including", "containing", "comprising", "having", and similar terms shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, a component that is "configured to" perform a specified function is capable of performing the specified function without alteration, rather than merely having potential to perform the specified function after further modification. In other words, the disclosed hardware, when expressly configured to perform the specified function, is specifically selected, created, implemented, utilized, programmed, and/or designed for the purpose of performing the specified function.

The terminology used herein is for the purpose of disclosing particular example embodiments and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof.

Although the open-ended term "comprising," is to be understood as a non-restrictive term used to disclose and claim various embodiments set forth herein, in certain aspects, the term may alternatively be understood to instead be a more limiting and restrictive term, such as "consisting of" or "consisting essentially of." Thus, for a given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps.

In the case of "consisting of," the alternative embodiment excludes additional compositions, materials, components, elements, features, integers, operations, and/or process steps, while in the case of "consisting essentially of," additional compositions, materials, components, elements, features, integers, operations, and/or process steps that materially affect the basic and novel characteristics are excluded from such an embodiment, but compositions, materials, components, elements, features, integers, operations, and/or process steps that do not materially affect the basic and novel characteristics may be included in the embodiment.

Method steps, processes, and operations disclosed herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to disclose the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to disclose various steps, elements, components, regions, layers and/or sections, these steps, elements, components, regions, layers and/or sections should not be limited by these terms, unless otherwise indicated. These terms may be used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section disclosed herein could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein to disclose one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed disclosure, numerical values of parameters (e.g., of quantities or conditions) in this specification, including the appended claims, are to be understood as being modified by the term "about" or "approximately" regardless of whether "about" or "approximately" actually appears before the numerical value. In addition, disclosure of ranges includes disclosure of values and further divided ranges within the entire range, including endpoints and sub-ranges given for the ranges.

The word "about" or "approximately" indicates that the stated numerical value allows some slight imprecision (with some approach to exactness in the value; approximately or reasonably close to the value; nearly). If the imprecision provided by "about" or "approximately" is not otherwise understood in the art with this ordinary meaning, then "about" or "approximately" as used herein indicates at least variations that may arise from ordinary methods of measuring and using such parameters. For example, "about" or "approximately" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

What is claimed is:

1. A multi-function fuel delivery system, comprising:
    a hydrogen (H2) heat exchanger configured to (i) receive cold H2, and (ii) perform an H2 fuel heating/cooling function on the cold H2;
    an H2 fuel manifold configured to (i) receive a heated H2 fuel after the cold H2 has been heated by the H2 heat exchanger, and (ii) perform an H2 noise-attenuating function on the heated H2 to reduce noise; and
    an upper fuel rail (UFR) configured to (i) receive, as noise-attenuated H2, the heated H2 that is noise-attenuated by the H2 fuel manifold, and (ii) provide the noise-attenuated H2 simultaneously to a plurality of injectors,
    wherein the H2 fuel manifold and the UFR are housed in a single chamber.

2. The fuel delivery system of claim 1, wherein the single chamber is located at an inlet of the plurality of injectors.

3. The fuel delivery system of claim 2, wherein the plurality of injectors are pulsed-type H2 injectors.

4. The fuel delivery system of claim 1, wherein a sidewall or face of the H2 fuel manifold comprises an H2 input port.

5. The fuel delivery system of claim 1, wherein the single chamber provides mechanical isolation of the plurality of injectors.

6. The fuel delivery system of claim 1, further comprising a lower fuel rail (LFR) configured to provide the noise-attenuated H2 fuel from an outlet of the plurality of injectors.

7. The fuel delivery system of claim 6, wherein the LFR is mounted to the single chamber.

8. The fuel delivery system of claim 1, wherein the noise-attenuating function considers a number of the plurality of injectors, system pressure, and flow rates.

9. The fuel delivery system of claim 1, wherein the UFR is integrated into a primary flow path of the noise-attenuated H2 provided to the plurality of injectors.

10. A method of providing fuel delivery, the method comprising:
    receiving cold hydrogen (H2) and performing an H2 heating/cooling function on the cold H2, thereby producing heated H2;
    performing an H2 noise-attenuating function on the heated H2 to reduce noise, thereby producing noise-attenuated H2; and
    providing the noise-attenuated H2 simultaneously to a plurality of injectors having an inlet,
    wherein the H2 noise-attenuating function and providing the noise-attenuated H2 are performed in a single chamber that is located at the inlet of the plurality of injectors.

11. The method of claim 10, wherein the plurality of injectors are pulsed-type H2 injectors.

12. The method of claim 10, wherein the single chamber provides mechanical isolation of the plurality of injectors.

13. The method of claim 10, wherein the noise-attenuated H2 is provided via an outlet of the plurality of injectors by a lower fuel rail (LFR) mounted to the single chamber.

14. The method of claim 10, wherein the noise-attenuating function considers a number of the plurality of injectors, system pressure, and flow rates.

15. The method of claim 10, wherein receiving the noise-attenuated H2 and providing the noise-attenuated H2 is performed by an upper fuel rail (UFR).

16. The method of claim 15, wherein the UFR is integrated into a primary flow path of the noise-attenuated H2 provided to the plurality of injectors.

17. A noise-attenuating and fuel injector housing device, comprising:
    a hydrogen (H2) fuel manifold contained in a noise-attenuating volume, wherein the H2 fuel manifold is configured to receive heated H2 via a fuel input port located on a sidewall or face of the noise-attenuating volume, and to perform a noise-attenuating function on the heated H2 to reduce noise; and
    an upper fuel rail (UFR) configured to receive H2 noise-attenuated by the H2 fuel manifold, and to provide the noise-attenuated H2 simultaneously to a plurality of injectors,
    wherein the noise-attenuating volume is mounted on a lower fuel rail (LFR) and configured to (i) provide the noise-attenuated H2 from an outlet of the plurality of injectors, and (ii) mechanically isolate the plurality of injectors.

18. The device of claim 17, wherein the noise-attenuating function considers a number of the plurality of injectors, system pressure, and flow rates.

19. The device of claim 17, wherein the noise attenuating volume is integrated into a primary flow path of the noise-attenuated H2 to the plurality of injectors.

20. The device of claim 17, wherein the H2 fuel manifold and the UFR are housed in a single chamber.

* * * * *